United States Patent
Chakraborty et al.

(10) Patent No.: US 10,904,843 B2
(45) Date of Patent: Jan. 26, 2021

(54) TECHNIQUES AND APPARATUSES FOR HANDLING POWER STATE TRANSITIONS OF A BEAMFORMING APPARATUS

(71) Applicant: QUALCOMM Incorporated, San Diego, CA (US)

(72) Inventors: Kaushik Chakraborty, San Diego, CA (US); Tao Luo, San Diego, CA (US); Shrenik Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/958,679

(22) Filed: Apr. 20, 2018

(65) Prior Publication Data

US 2018/0332544 A1 Nov. 15, 2018

Related U.S. Application Data

(60) Provisional application No. 62/506,488, filed on May 15, 2017.

(51) Int. Cl.
*H04W 52/42* (2009.01)
*H04W 52/14* (2009.01)
*H04W 52/02* (2009.01)

(52) U.S. Cl.
CPC ....... *H04W 52/42* (2013.01); *H04W 52/0283* (2013.01); *H04W 52/146* (2013.01)

(58) Field of Classification Search
CPC ............................................. H04W 52/00–60
See application file for complete search history.

(56) References Cited

U.S. PATENT DOCUMENTS

| | | | |
|---|---|---|---|
| 2005/0200524 A1* | 9/2005 | Grandhi | H01Q 1/242 342/374 |
| 2006/0034239 A1* | 2/2006 | Abeta | H04B 7/2618 370/341 |
| 2009/0203405 A1* | 8/2009 | Horneman | H04B 7/0617 455/562.1 |
| 2012/0044842 A1* | 2/2012 | Nammi | H04W 72/1205 370/281 |
| 2013/0083729 A1* | 4/2013 | Xu | H04W 52/325 370/328 |
| 2013/0272220 A1* | 10/2013 | Li | H04W 72/046 370/329 |

(Continued)

OTHER PUBLICATIONS

International Search Report and Written Opinion—PCT/US2018/028854—ISA/EPO—dated Jul. 26, 2018.

*Primary Examiner* — Raymond S Dean
(74) *Attorney, Agent, or Firm* — Harrity & Harrity, LLP

(57) ABSTRACT

A method, an apparatus, and a computer program product for wireless communication are provided. According to some aspects, the apparatus may identify a first power state and a second power state, wherein the first power state is associated with a first transmission or reception of one or more first beams, and the second power state is associated with a second transmission or reception of one or more second beams; and/or switch from the first power state to the second power state, wherein the apparatus is configured to use at least one of a scheduled gap or at least one intermediate power state between the first power state and the second power state to smooth a transition from the first power state to the second power state. Numerous other aspects are provided.

40 Claims, 10 Drawing Sheets

(56) References Cited

U.S. PATENT DOCUMENTS

| | | | |
|---|---|---|---|
| 2014/0073329 A1* | 3/2014 | Kang | H04W 36/30 |
| | | | 455/439 |
| 2014/0093012 A1 | 4/2014 | Zhang et al. | |
| 2014/0349587 A1 | 11/2014 | Frenger et al. | |
| 2015/0031410 A1 | 1/2015 | Lim et al. | |
| 2016/0081071 A1* | 3/2016 | Song | H04L 1/00 |
| | | | 370/280 |
| 2016/0183234 A1* | 6/2016 | Sung | H04W 72/046 |
| | | | 370/329 |
| 2016/0242159 A1* | 8/2016 | Ho | H04B 7/0408 |
| 2017/0156108 A1* | 6/2017 | Kim | H04J 11/00 |
| 2018/0184454 A1* | 6/2018 | Viger | H04W 74/0808 |
| 2018/0343043 A1* | 11/2018 | Hakola | H04B 7/0417 |

\* cited by examiner

TECHNIQUES AND APPARATUSES FOR HANDLING POWER STATE TRANSITIONS OF A BEAMFORMING APPARATUS

CROSS-REFERENCE TO RELATED APPLICATION UNDER 35 U.S.C. § 119

This application claims priority to Provisional Patent Application No. 62/506,488, filed May 15, 2017, entitled "TECHNIQUES AND APPARATUSES FOR HANDLING POWER STATE TRANSITIONS OF A BEAMFORMING APPARATUS," which is hereby expressly incorporated by reference herein.

BACKGROUND

Field

Aspects of the present disclosure generally relate to wireless communication, and more particularly to techniques and apparatuses for smoothing power state transitions of a beamforming apparatus.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different wireless communication devices to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In an aspect of the disclosure, a method, an apparatus, and a computer program product are provided.

In some aspects, the method may include identifying, by a UE, a first power state and a second power state, wherein the first power state is associated with a first transmission or reception of one or more first beams, and the second power state is associated with a second transmission or reception of one or more second beams; and/or switching, by the UE, from the first power state to the second power state, wherein the UE is configured to use at least one of a scheduled gap or at least one intermediate power state between the first power state and the second power state to smooth a transition from the first power state to the second power state.

In some aspects, the apparatus may include a memory and at least one processor coupled to the memory. The at least one processor may be configured to identify a first power state and a second power state, wherein the first power state is associated with a first transmission or reception of one or more first beams, and the second power state is associated with a second transmission or reception of one or more second beams; and/or switching from the first power state to the second power state, wherein the at least one processor is configured to use at least one of a scheduled gap or at least one intermediate power state between the first power state and the second power state to smooth a transition from the first power state to the second power state.

In some aspects, the apparatus may include means for identifying a first power state and a second power state, wherein the first power state is associated with a first transmission or reception of one or more first beams, and the second power state is associated with a second transmission or reception of one or more second beams; and/or means for switching from the first power state to the second power state, wherein the apparatus is configured to use at least one of a scheduled gap or at least one intermediate power state between the first power state and the second power state to smooth a transition from the first power state to the second power state.

In some aspects, the computer program product may include a non-transitory computer-readable medium storing computer executable code. The code may include code for identifying, by a UE, a first power state and a second power state, wherein the first power state is associated with a first transmission or reception of one or more first beams, and the second power state is associated with a second transmission or reception of one or more second beams; and/or switching, by the UE, from the first power state to the second power state, wherein the UE is configured to use at least one of a scheduled gap or at least one intermediate power state between the first power state and the second power state to smooth a transition from the first power state to the second power state.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
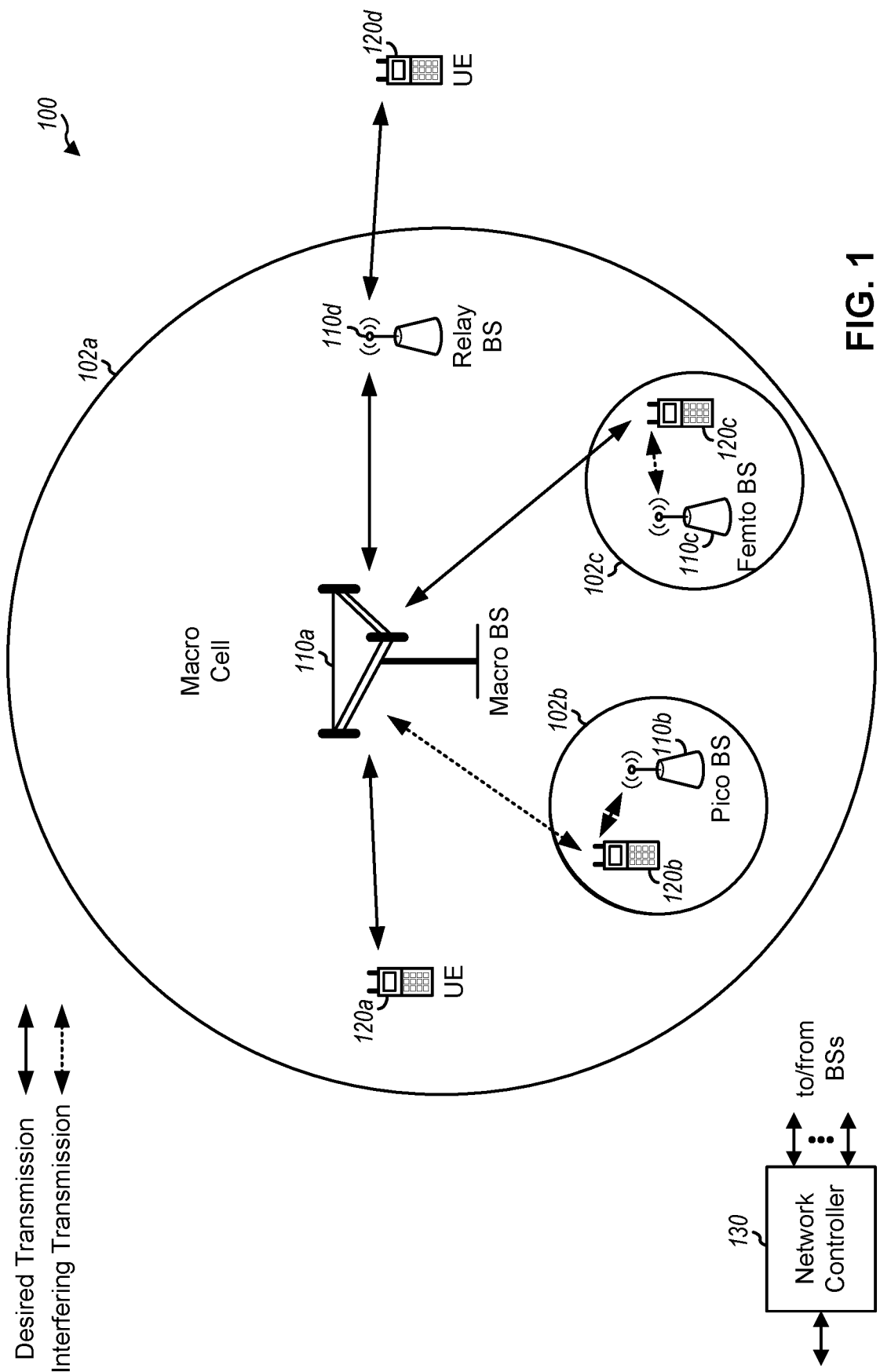
FIG. 1 is a diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a NR BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP")

phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link.

Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. In some aspects, MTC devices may be referred to as enhanced MTC (eMTC) devices, LTE category M1 (LTE-M) devices, machine to machine (M2M) devices, and/or the like. Additionally, or alternatively, some UEs may be narrowband Internet of things (NB-IoT) devices.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE).

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
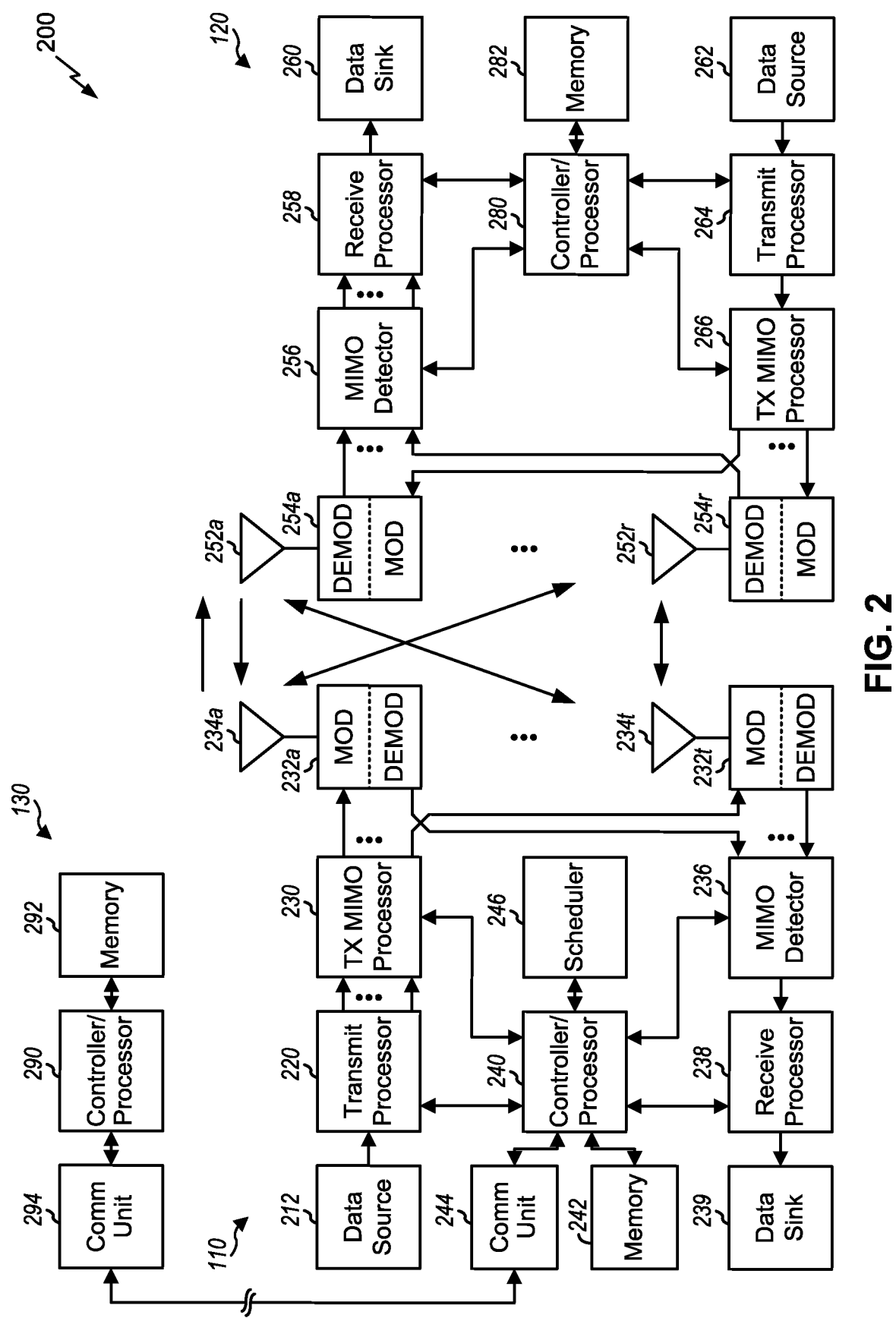
FIG. 2 is a diagram illustrating an example of a base station in communication with a user equipment (UE) in a wireless communication network.

FIG. 2 shows a block diagram 200 of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at BS 110 and UE 120, respectively, to perform smoothing power state transitions of a beamforming apparatus. For example, controller/processor 240 and/or other processors and modules at BS 110, may perform or direct operations of UE 120 to perform smoothing power state transitions of a beamforming apparatus. For example, controller/processor 240 and/or other controllers/processors and modules at BS 110 may perform or direct operations of, for example, method 900 of FIG. 9, and/or other processes as described herein. Additionally, or alternatively, controller/processor 280 and/or other processors and modules at UE 120, may perform or direct operations of UE 120 to perform smoothing power state transitions of a beamforming apparatus. For example, controller/processor 280 and/or other controllers/processors and modules at UE 120 may perform or direct operations of, for example, method 900 of FIG. 9, and/or other processes as described herein. In some aspects, one or more of the components shown in FIG. 2 may be employed to perform example method 900 of FIG. 9, and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
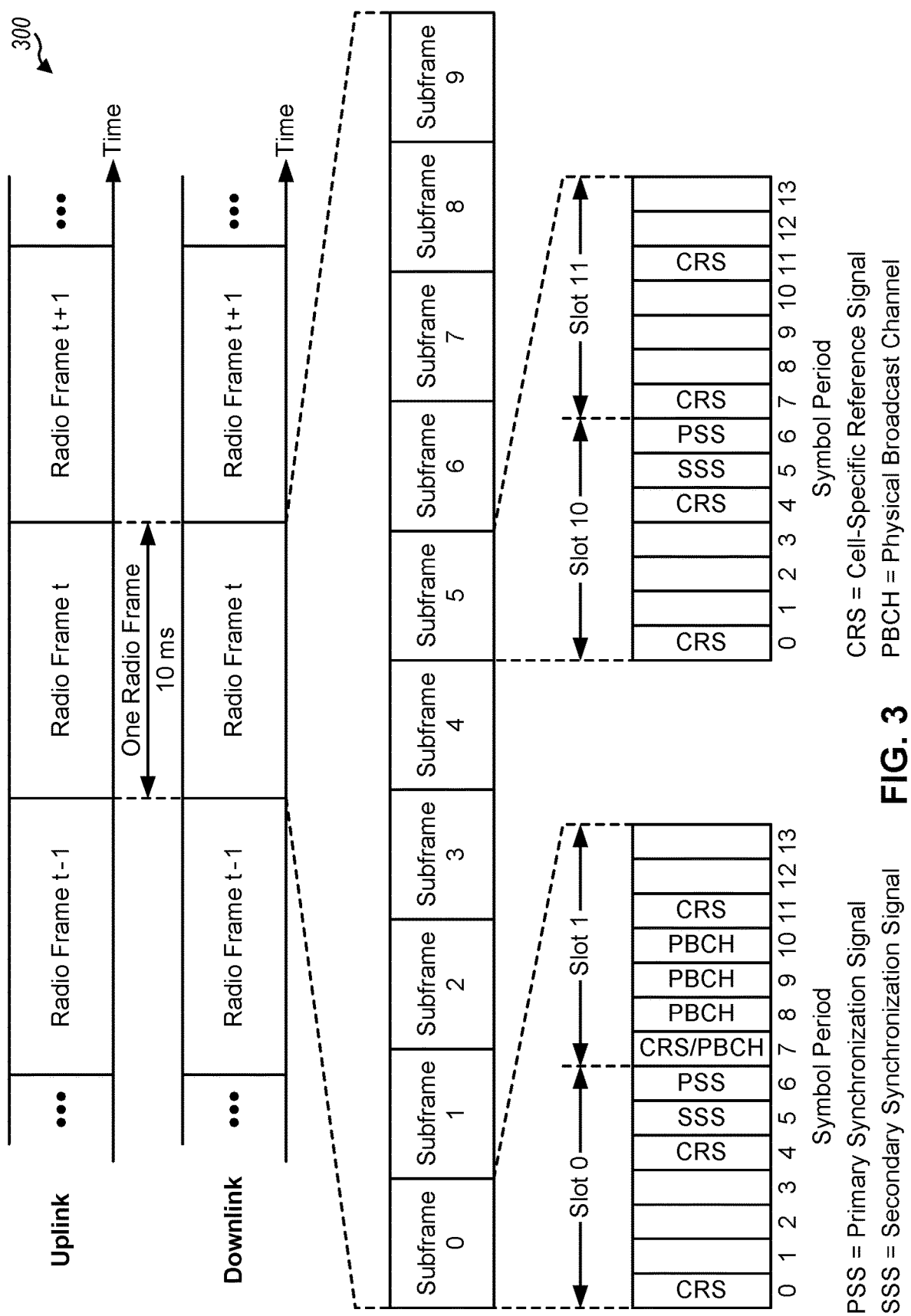
FIG. 3 is a diagram illustrating an example of a frame structure in a wireless communication network.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
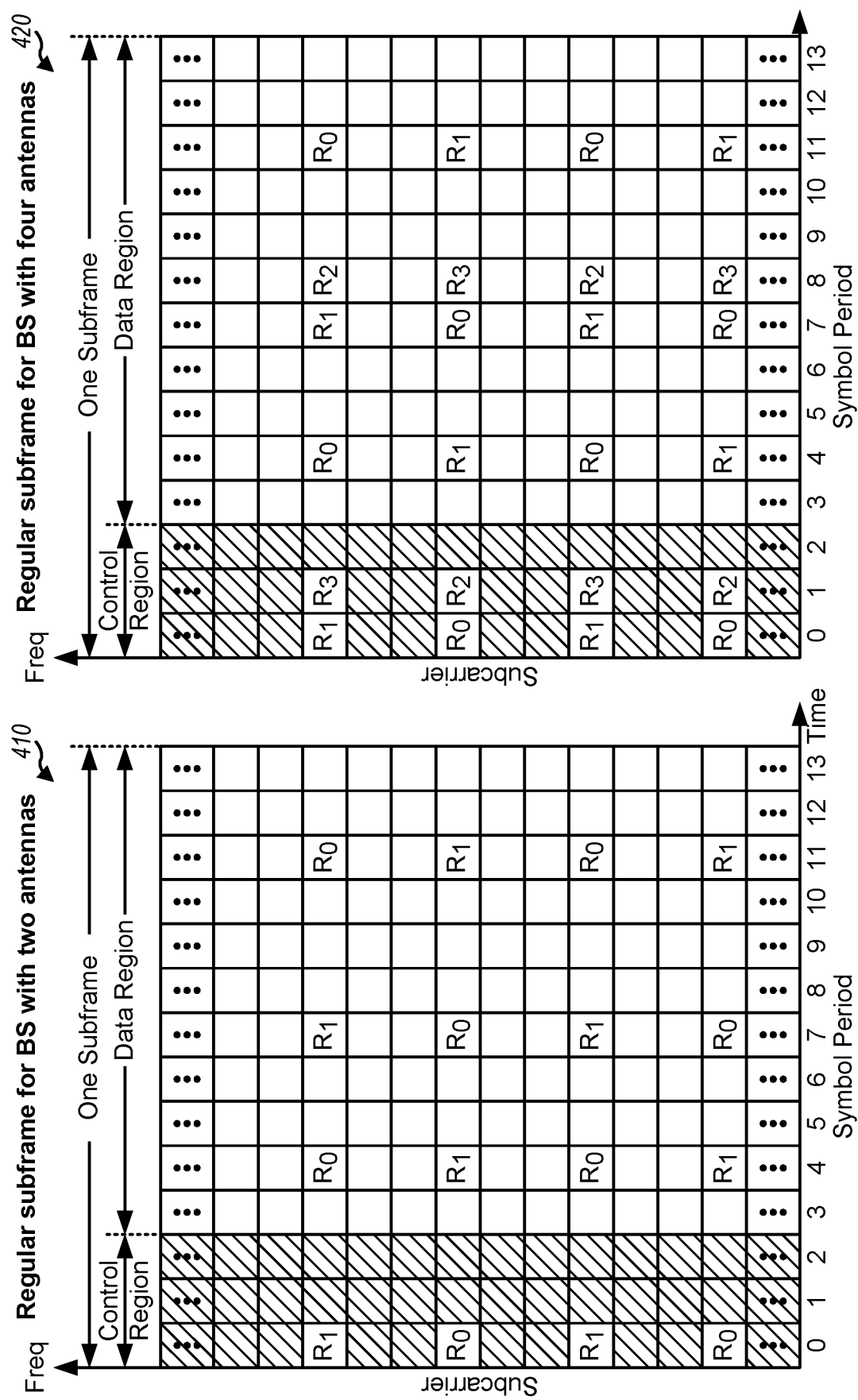
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, and/or the like, where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
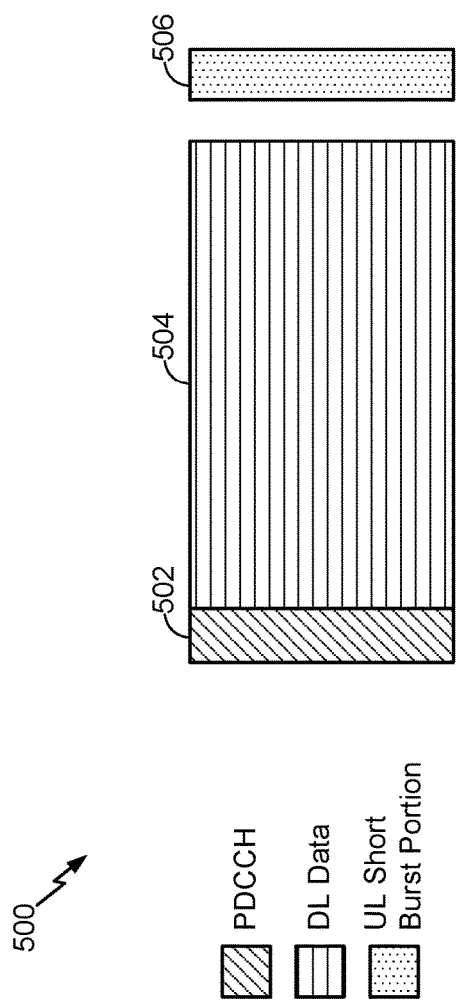
FIG. 5 is a diagram illustrating an example of a downlink (DL)-centric wireless communication structure.

FIG. 5 is a diagram 500 showing an example of a DL-centric subframe or wireless communication structure. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5.

The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include an UL short burst portion 506. The UL short burst portion 506 may sometimes be referred to as an UL burst, an UL burst portion, a common UL burst, a short burst, an UL short burst, a common UL short burst, a common UL short burst portion, and/or various other suitable terms. In some aspects, the UL short burst portion 506 may include one or more reference signals. Additionally, or alternatively, the UL short burst portion 506 may include feedback information corresponding to various other portions of the DL-centric subframe. For example, the UL short burst portion 506 may include feedback information corresponding to the control portion 502 and/or the data portion 504. Non-limiting examples of information that may be included in the UL short burst portion 506 include an acknowledgment (ACK) signal (e.g., a physical uplink control channel (PUCCH) ACK, a physical uplink shared channel (PUSCH) ACK, an immediate ACK), a negative ACK (NACK) signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 506 may include additional or alternative information, such as information pertaining to random access channel (RACH) procedures, scheduling requests, and various other suitable types of information.

As illustrated in FIG. 5, the end of the DL data portion 504 may be separated in time from the beginning of the UL short burst portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 5 is provided merely as an example. Other examples are possible and may differ from what was described with regard to FIG. 5.

Figure 6:
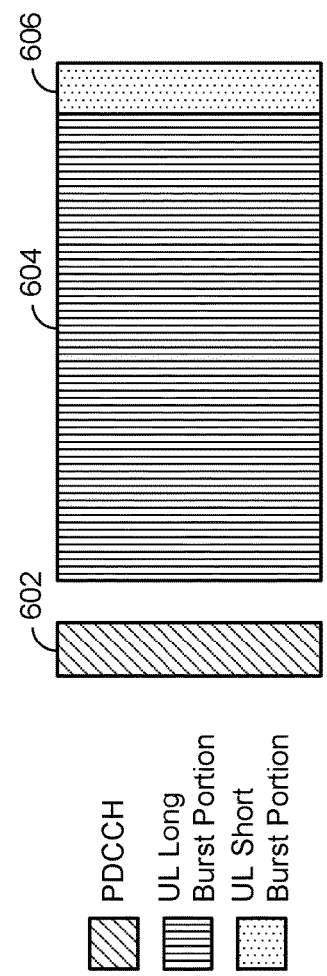
FIG. 6 is a diagram illustrating an example of an uplink (UL)-centric wireless communication structure.

FIG. 6 is a diagram 600 showing an example of an UL-centric subframe or wireless communication structure. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. In some configurations, the control portion 602 may be a physical DL control channel (PDCCH).

The UL-centric subframe may also include an UL long burst portion 604. The UL long burst portion 604 may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 6, the end of the control portion 602 may be separated in time from the beginning of the UL long burst portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 606. The UL short burst portion 606 in FIG. 6 may be similar to the UL short burst portion 506 described above with reference to FIG. 5, and may include any of the information described above in connection with FIG. 5. The foregoing is merely one example of an UL-centric wireless communication structure and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 6 is provided merely as an example. Other examples are possible and may differ from what was described with regard to FIG. 6.

Figure 7:
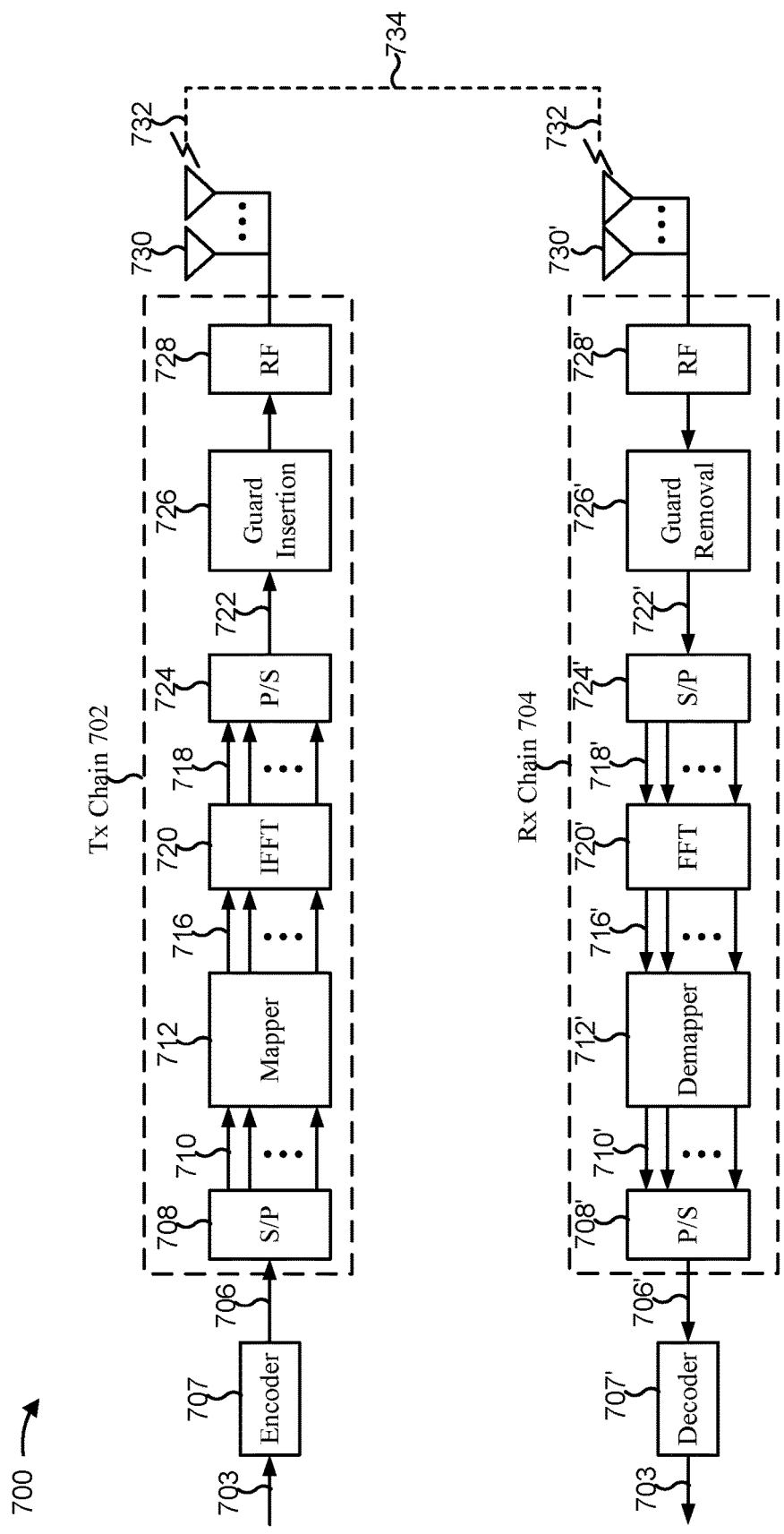
FIG. 7 is a diagram illustrating an example transmission chain and an example receiver chain that may be used within a wireless communication system, in accordance with various aspects of the present disclosure.

FIG. 7 is a diagram illustrating an example 700 of a transmission (Tx) chain 702 and a receiver (Rx) chain 704 that may be used within a wireless communication system, in accordance with various aspects of the present disclosure. In some aspects, portions of Tx chain 702 may be implemented in components 232 and/or 234 of BS 110, shown in FIG. 2. In some aspects, Tx chain 702 may be implemented in BS 110 for transmitting data 706 to UE 120 on a downlink channel. In some aspects, Tx chain 702 may be implemented in UE 120 for transmitting data 706 to BS 110 on an uplink channel.

An encoder 707 may alter a signal (e.g., a bitstream) 703 into data 706. Data 706 to be transmitted is provided from encoder 707 as input to a serial-to-parallel (S/P) converter 708. In some aspects, S/P converter 708 may split the transmission data into N parallel data streams 710.

The N parallel data streams 710 may then be provided as input to a mapper 712. Mapper 712 may map the N parallel data streams 710 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 712 may output N parallel symbol streams 716, each symbol stream 716 corresponding to one of N orthogonal subcarriers of an inverse fast Fourier transform (IFFT) component 720. These N parallel symbol streams 716 are represented in the frequency domain and may be converted into N parallel time domain sample streams 718 by IFFT component 720.

In some aspects, N parallel modulations in the frequency domain are equal to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 718 may be converted into an OFDM/OFDMA symbol stream 722 by a parallel-to-serial (P/S) converter 724. A guard insertion component 726 may insert a guard interval between successive OFDM/OFDMA symbols in the OFDM/OFDMA symbol stream 722. The output of guard insertion component 726 may then be upconverted to a desired transmit frequency band by a radio frequency (RF) front end 728. An antenna 730 may then transmit the resulting signal 732.

In some aspects, Rx chain 704 may utilize OFDM/OFDMA. In some aspects, portions of Tx chain 702 may be implemented in components 232 and/or 254, shown in FIG. 2. In some aspects, Rx chain 704 may be implemented in UE 120 for receiving data 706 from BS 110 on a downlink channel. In some aspects, Rx chain 704 may be implemented in BS 110 for receiving data 706 from UE 120 on an uplink channel.

A transmitted signal 732 is shown traveling over a wireless channel 734 from Tx chain 702 to Rx chain 704. When a signal 732' is received by an antenna 730', the received signal 732' may be downconverted to a baseband signal by an RF front end 728'. A guard removal component 726' may then remove the guard interval that was inserted between OFDM/OFDMA symbols by guard insertion component 726.

The output of guard removal component 726' may be provided to an S/P converter 724'. The output may include an OFDM/OFDMA symbol stream 722', and S/P converter 724' may divide the OFDM/OFDMA symbol stream 722' into N parallel time-domain symbol streams 718', each of which corresponds to one of the N orthogonal subcarriers. A fast Fourier transform (FFT) component 720' may convert the N parallel time-domain symbol streams 718' into the frequency domain and output N parallel frequency-domain symbol streams 716'.

A demapper 712' may perform the inverse of the symbol mapping operation that was performed by mapper 712, thereby outputting N parallel data streams 710'. A P/S converter 708' may combine the N parallel data streams 710' into a single data stream 706'. Ideally, data stream 706' corresponds to data 706 that was provided as input to Tx chain 702. Data stream 706' may be decoded into a decoded signal 703 by decoder 707'.

In some aspects, a UE 120 may include multiple, different Tx chains 702 and/or Rx chains 704. For example, a UE 120 that performs MIMO transmission/reception may be associated with multiple Tx chains 702 and multiple Rx chains 704. As another example, a UE 120 that performs beamforming for mm Wave applications may simultaneously use multiple Tx chains 702 to form one or more beams, and/or may simultaneously use multiple Rx chains 704 to receive one or more beams. Each active Tx chain 702 and Rx chain 704 may draw power from a power supply of the UE 120 (e.g., a voltage rail and/or the like). For example, a UE 120 may activate or deactivate Tx chains 702 and Rx chains 704 as needed, which may increase or decrease the amount of power drawn from the power supply. Additionally, or alternatively, each Tx chain 702 and/or Rx chain 704 may be associated with at least one respective amplifier (e.g., a power amplifier (PA) for a Tx chain 702, and a low noise amplifier (LNA) for an Rx chain 704), and power draw of the at least one respective amplifier may vary based at least in part on actions to be performed by the Tx chain 702 and/or the Rx chain 704. Techniques and apparatuses described herein provide smooth transitions between power states associated with changing power draws of the Tx chain(s) 702 and the Rx chain(s) 704.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of components (e.g., one or more components) shown in FIG. 7 may perform one or more functions described as being performed by another set of components shown in FIG. 7.

A UE 120 may transmit or receive signals using Tx chains and Rx chains of the UE 120, such as the Tx chain 702 and the Rx chain 704 described in connection with FIG. 7, above. In some situations, such as with regard to mm Wave communication, power draw of the UE 120 may change rapidly. For example, when the UE 120 switches from transmitting one set of one or more beams to another set of one or more beams, the power state of Tx chains of the UE 120 may change in accordance with the switch. This change can happen on a sub-slot time interval, or even within a transmission time associated with a single symbol.

As examples of changing power states, the gain on one or more amplifiers of a Tx chain or Rx chain could change. For example, on the Tx chain, one or more PAs can go from a lower gain state to a higher gain state. This transition can be governed by the automatic gain control (AGC) algorithm that runs on the UE 120 in order to maintain reliable link quality on the UE 120. In another case, the number of RF chains (e.g., Tx chains and Rx chains) that are actively being used to create a beam may change. For example, in one instant, the UE 120 may be forming a Tx beam with only four Tx chains (including 4 antenna elements and PAs), but in the next instant the UE 120 may switch to forming another Tx beam with 8 or 16 RF chains. In this case, even though each active PA may be drawing the same current in the two instances, the total current draw goes up significantly from one instant to another.

The above scenarios, and similar scenarios, may cause unwanted effects on a power supply rail of the UE 120. For example, rapid changes in power draw can cause transient effects that lead to inaccuracy in provided power. Also, rapid changes in power draw can lead to nonlinearities because of an inability of the UE 120 to modify the provided power in synchronization with the requirements of Tx chains of the UE. Furthermore, while the above is described primarily in the context of Tx chains, similar issues can be encountered with Rx chains. For example, the UE 120 may need to activate or deactivate Rx chains at a rapid pace to receive different beams, so power draw of Rx chains may change rapidly, leading to the same or similar transient effects and nonlinearities described above.

Some techniques and apparatuses described herein smooth a transition between a first power state and a second power state to reduce an impact of transient effects and/or nonlinearities with regard to signals transmitted or received by a UE 120. For example, some techniques and apparatuses described herein may use at least one intermediate power state in between the first power state and the second power state to smooth the transition. Additionally, or alternatively, some techniques and apparatuses described herein may use a scheduled gap between the first power state and the second power state to smooth the transition between the first power state and the second power state. Thus, some techniques and apparatuses described herein reduce unwanted effects (e.g., nonlinearities and/or transient effects) when transitioning between a first power state and a second power state.

Figure 8:
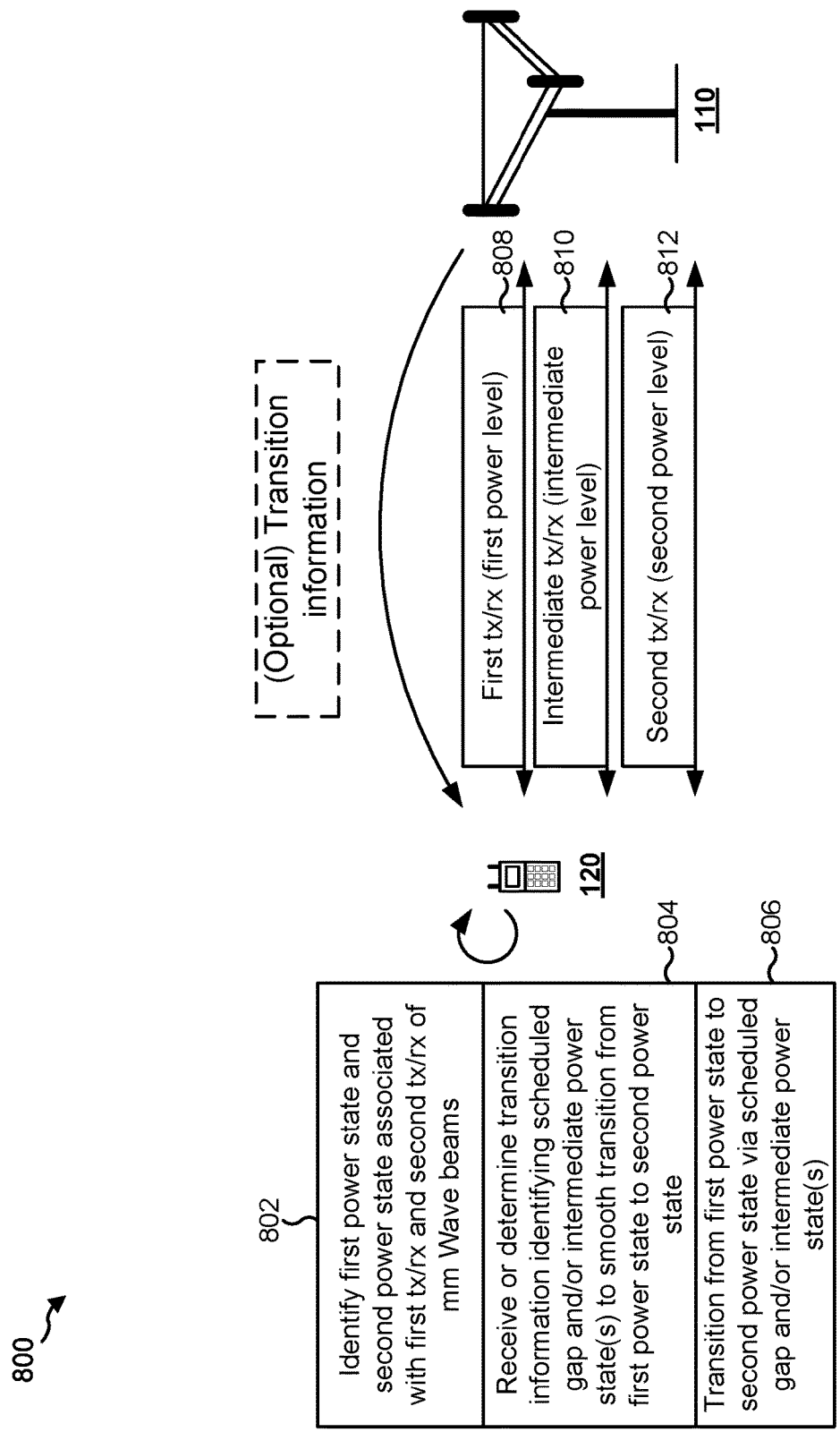
FIG. 8 is a diagram illustrating an example of transitioning from a first power state to a second power state using a scheduled gap or intermediate power state to smooth the transition.

FIG. 8 is a diagram illustrating an example 800 of transitioning from a first power state to a second power state using a scheduled gap or intermediate power state to smooth the transition.

As shown in FIG. 8, and by reference number 802, a UE 120 may identify a first power state and a second power state. As further shown, in some aspects, the first power state and the second power state may be associated with a first transmission or reception and a second transmission or reception of mm Wave beams. In some aspects, the first power state and the second power state may be associated with transmission of single beams, transmission of multiple beams, a first transmission of a single beam and a second transmission of multiple beams, a first transmission of multiple beams and a second transmission of a single beam, and/or the like. Additionally, or alternatively, the first power state and the second power state may be associated with reception of single beams, reception of multiple beams, a first reception of a single beam and a second reception of multiple beams, a first reception of multiple beams and a second reception of a single beam, and/or the like. In some aspects, the first power state and the second power state may be associated with transmissions or receptions of a type other than mm Wave, such as sub-6 GHz massive MIMO systems. For example, aspects described herein may be performed in any multiple-antenna system that is subject to rapid power state change.

As examples of a first transmission or reception and a second transmission or reception, the UE 120 may use broad, low-power beams for reference signals (e.g. synchronization signals or channel state information reference signals) but may switch to a narrow, high-power beam for a downlink shared channel (PDSCH) data transfer. As another example, the UE 120 may use a low-power beam (reception configuration) to detect a serving cell reference signal, and may switch to a high-power beam (reception configuration) to detect neighbor cell reference signals. As a third example, the UE 120 may switch to different beam directions using different power levels to maintain links with two different BSs 110 (e.g., gNBs, transmission/reception points (TRPs), etc.). As a fourth example, a UE 120 may transition from a sounding reference signal (SRS) or a physical uplink control channel (PUCCH) to an uplink data transmission (e.g., a PUSCH). Of course, the above list is not exhaustive, and other examples of first transmissions/receptions and second transmissions/receptions are not precluded from aspects described herein.

The first power state may be different than the second power state. For example, a gain state of a PA or LNA of the UE 120 may be different for the first power state than for the second power state, which may cause a different power draw from a supply rail of the UE 120. Additionally, or alternatively, the UE 120 may need to activate or deactivate one or more antennas or RF chains (e.g., Tx chains and/or Rx chains) to transmit or receive the second transmission. Additionally, or alternatively, the first power state may be different than the second power state based at least in part on another change in a transmission or reception configuration of the UE 120.

As shown by reference number 804, the UE 120 may receive or determine transition information. The transition information may identify at least one of a scheduled gap and/or at least one intermediate power state. The UE 120 may implement the transition information to smooth a transition from the first power state to the second power state.

In some aspects, the UE 120 may determine the transition information. As one example, the UE 120 may store or maintain information identifying beam pairs that require particular transition states when transitioning from a first transmission or reception (e.g., associated with a first power state) to a second transmission or reception (e.g., associated with a second power state). In such a case, the information identifying the beam pairs may be associated with additional parameters, such as a power difference or imbalance between the beams, a minimum time gap required between the first power state and the second power state, and/or the like.

The UE 120 may use the stored information to determine the scheduled gap and/or the at least one intermediate power state. For example, assume that the UE 120 is to transition from Beam 1, associated with a power P1, to Beam 2 associated with a power P2. Assume further that P2>P1+ΔP. In other words, assume that P2 is greater than P1 by at least a threshold amount ΔP. In such a case, the UE 120 may identify an intermediate power state wherein the UE 120 transitions from Beam 1, power P1 to Beam 2, power P1+ΔP/2, then from Beam 2, power P1+ΔP/2 to Beam 2, power P2. In this way, the transition from power state P1 to power state P2 is smoothed by the introduction of power state P1+ΔP/2.

Additionally, or alternatively, as shown, the BS 110 may provide the transition information. For example, in some aspects, the BS 110 may schedule the first transmission or reception and the second transmission or reception of the UE 120. In such a case, the BS 110 may provide information indicating that the UE 120 is to use the scheduled gap and/or information indicating that the UE 120 is to transmit the at least one intermediate transmission. In this way, the BS 110 may schedule the UE 120 to perform a smooth transition, which conserves processor resources of the UE 120 that would otherwise be used to determine how to perform the smooth transition.

In a case wherein the BS 110 provides the transition information, the UE 120 may indicate beam transition restrictions to the BS 110 (e.g., in a UE capability report). For example, the UE 120 may provide an explicit indication of restricted beam pairs for which a scheduled gap and/or intermediate power state is to be implemented. Additionally, or alternatively, the UE 120 may report additional constraints, such as power imbalance thresholds, minimum gaps between power states, and/or the like. The BS 110 may use the indicated beam transition restrictions to schedule the first transmission or reception, the second transmission or reception, and the scheduled gap and/or a transmission or reception associated with the intermediate power state.

In some aspects, the UE 120 may signal a request to the BS 110 for a guard period. For example, a guard period may be used between a first transmission or reception and a second transmission or reception to protect signals before and after the beam transition. For example, a gap between a channel state information reference signal and a data beam can be introduced to smooth a beam transition from the channel state information reference signal to the data beam. In some aspects, the gap may include a single symbol, multiple symbols, a single slot, or another length of time. In some aspects, the UE 120 may switch to an intermediate beam using intermediate power level during the guard period. In some aspects, the guard period can be dynamically activated and deactivated by UE signaling (e.g., based at least in part on channel conditions, a power imbalance threshold, and/or the like).

As shown by reference number 806, the UE 120 may transition from the first power state (associated with the first transmission) to the second power state (associated with the second transmission) via the scheduled gap and/or the at least one intermediate power state. For example, and as shown by reference number 808, the UE 120 may transmit or receive the first transmission or reception at the first power level. In some aspects, the first transmission may be a first uplink transmission.

As shown by reference number 810, the UE 120 may transmit or receive an intermediate transmission or reception at an intermediate power level to smooth the transition from the first transmission or reception to the second transmission or reception. In some aspects, the UE 120 may transmit or receive multiple, different intermediate transmissions at corresponding intermediate power levels. In some aspects, the UE 120 may transmit blank symbols in a scheduled gap between the first transmission and the second transmission to form the intermediate transmission. In such a case, the BS 110 may discard the blank symbols. Additionally, or alternatively, the UE 120 may perform retransmission or repetition of the first transmission or the second transmission at the intermediate power level to form the intermediate transmission. As shown by reference number 812, the UE 120 may transmit or receive the second transmission or reception at the second power level. In this way, a transition from a first power level to a second power level is smoothed, which reduces transient and other unwanted effects on a power supply of the UE 120, thereby conserving power resources of the UE 120. In some aspects, the second transmission may be a second uplink transmission. In some aspects, the second transmission may be consecutive to the first transmission (e.g., no intermediate transmission is provided). In such a case, a particular switching time parameter may be used for a gap or guard period between the first transmission and the second transmission. For example, the particular switching time parameter may have values of 10 microseconds, 5 microseconds, or a different value.

As a particular example of the above operations, in some aspects, the first transmission may be associated with a first set of SRS resources and the second transmission may be associated with a second set of SRS resources. In such a case, the first transmission and the second transmission may be performed in a same slot. The UE 120 may use a guard period (e.g., in which no other UE transmission is performed) of Y symbols between the first set of SRS resources and the second set of SRS resources, wherein Y is any integer. This may be beneficial when the first set of SRS resources and the second set of SRS resources are transmitted in a same slot.

In some aspects, the UE 120 may perform the above operations with regard to a first BS 110 and a second BS 110. For example, the UE 120 may determine at least one intermediate power level and/or a scheduled gap to smooth a transition between a first power state associated with transmissions or receptions of the first BS 110, and a second power state associated with transmissions or receptions of the second BS 110. In such a case, the UE 120 may signal UE capabilities to the first BS 110 and/or the second BS 110, and the first BS 110 and/or the second BS 110 may schedule a scheduled gap and/or a transmission or reception associated with an intermediate power state for the UE 120.

In some aspects, aspects described herein can be applied in a multi-link case (e.g., a case with two or more different radio access technologies that are associated with different transmission powers). For example, scheduled gaps or guard periods may be introduced between two beams or links with asymmetric power levels so that a transition between the two beams is smoothed. Additionally, or alternatively, the UE capability information and/or a signaling configuration of the UE 120 (e.g., signaling of the need for guard periods, scheduled gaps, and/or intermediate power states) may extend to multiple BSs 110, so that the multiple BSs 110 can coordinate to schedule the transition appropriately.

As indicated above, FIG. 8 is provided as an example. Other examples are possible and may differ from what was described with respect to FIG. 8.

Figure 9:
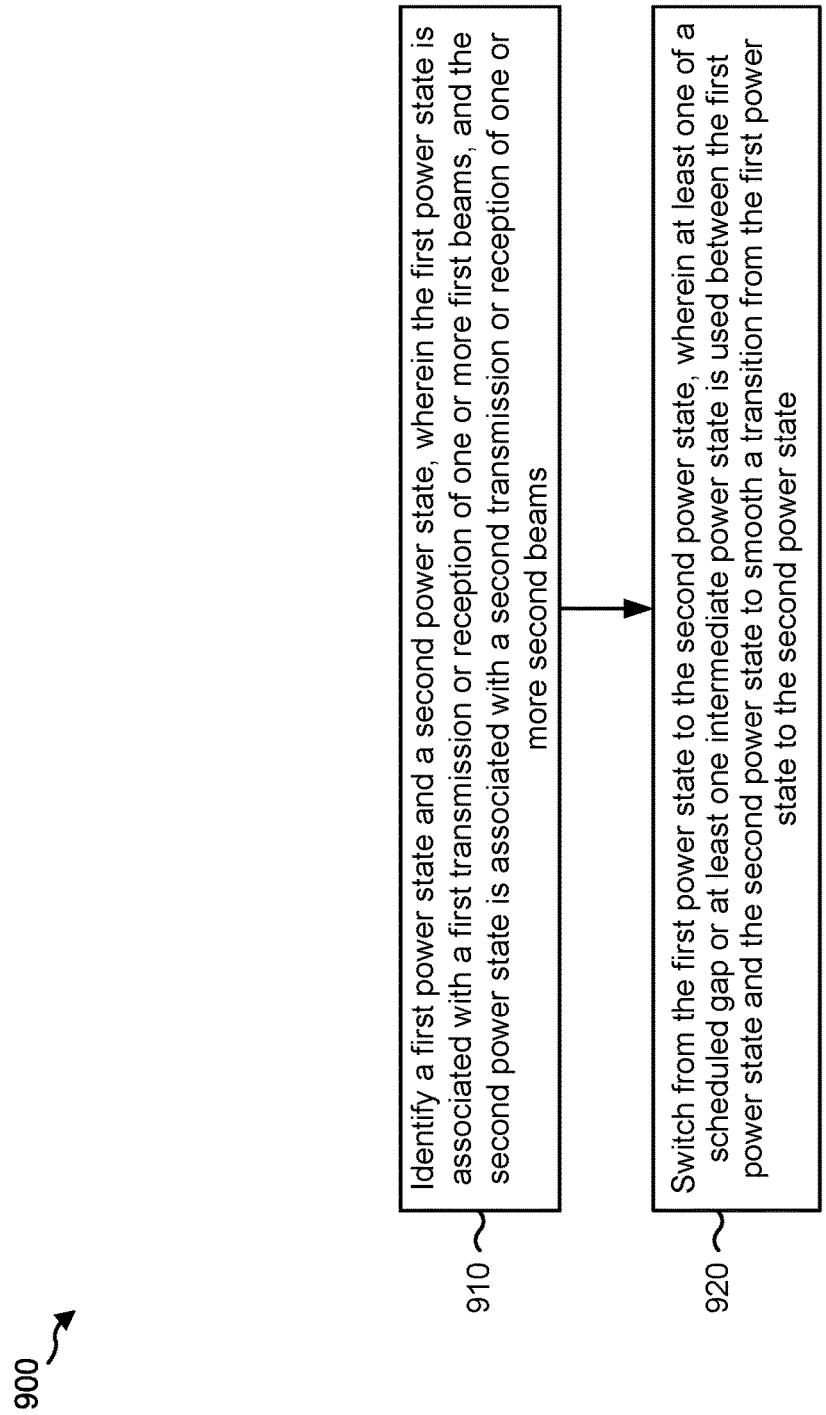
FIG. 9 is a flow chart of a method of wireless communication.

FIG. 9 is a flow chart of a method 900 of wireless communication. The method may be performed by a UE (e.g., the UE 120 of FIG. 1, the apparatus 1002/1002', and/or the like).

At 910, the UE may identify a first power state and a second power state, wherein the first power state is associated with a first transmission or reception of one or more first beams, and the second power state is associated with a second transmission or reception of one or more second beams. For example, the UE may identify a first power state, associated with a first transmission or reception, and a second power state associated with a second transmission or reception. In some aspects, the UE may determine that an intermediate power state and/or scheduled gap is to be used based at least in part on the first power state and the second power state (e.g., based at least in part on the first power state being different than the second power state by a threshold amount).

At 920, the UE may switch from the first power state to the second power state, wherein at least one of a scheduled gap or at least one intermediate power state is used between the first power state and the second power state to smooth a transition from the first power state to the second power state. For example, the UE may switch from the first power state to the second power state via a scheduled gap and/or at least one intermediate power state. The scheduled gap and/or the at least one intermediate power state may smooth the transition from the first power state to the second power state, which may reduce transient and/or another unwanted effect on a supply rail of the UE 120.

Process 900 may include additional aspects, such as any single aspect or any combination of aspects described below and/or in connection with one or more other processes described elsewhere herein.

In some aspects, the scheduled gap is negotiated by the UE and a base station associated with the UE. In some aspects, the UE is configured to use stored information to determine whether the scheduled gap or the at least one intermediate power state is to be used. In some aspects, the stored information includes at least one of: a beam identifier of the one or more first beams or the one or more second beams, a threshold power level difference of the first power state and the second power state, or a threshold length of the transition from the first power state to the second power state. In some aspects, the scheduled gap or the at least one intermediate power state is based at least in part on information signaled by a base station associated with the UE. In some aspects, the information signaled by the base station is based at least in part on a capability report associated with the UE. In some aspects, the UE is configured to determine the scheduled gap or the at least one intermediate power state based at least in part on a difference between the first power state and the second power state. In some aspects, the at least one intermediate power state includes a plurality of intermediate power states, and the UE is configured to switch to each intermediate power state, of the plurality of intermediate power states, when transitioning from the first power state to the second power state. In some aspects, the UE is configured to switch from the first power state to the second power state in a gap period or a guard period between the first transmission or reception and the second transmission or reception. In some aspects, the guard period is provided by a base station based at least in part on signaling, by the UE, indicating to provide the guard period. In some aspects, the UE is configured to transmit an intermediate beam associated with the at least one intermediate power state when switching from the first power state to the at least one intermediate power state. In some aspects, the intermediate beam corresponds to blank data, garbage data, or padding data. In some aspects, the intermediate beam corresponds to a retransmission or a repetition of data associated with the first transmission or the second transmission.

In some aspects, the first transmission is a first uplink transmission and the second transmission is a second uplink transmission consecutive to the first uplink transmission. In some aspects, the first transmission and the second transmission are for a first set of sounding reference signal resources and a second set of sounding reference signal resources, respectively. In some aspects, the first transmission and the second transmission are transmitted in a same slot.

Although FIG. 9 shows example blocks of a method of wireless communication, in some aspects, the method may include additional blocks, fewer blocks, different blocks, or differently arranged blocks than those shown in FIG. 9.

Additionally, or alternatively, two or more blocks shown in FIG. 9 may be performed in parallel.

Figure 10:
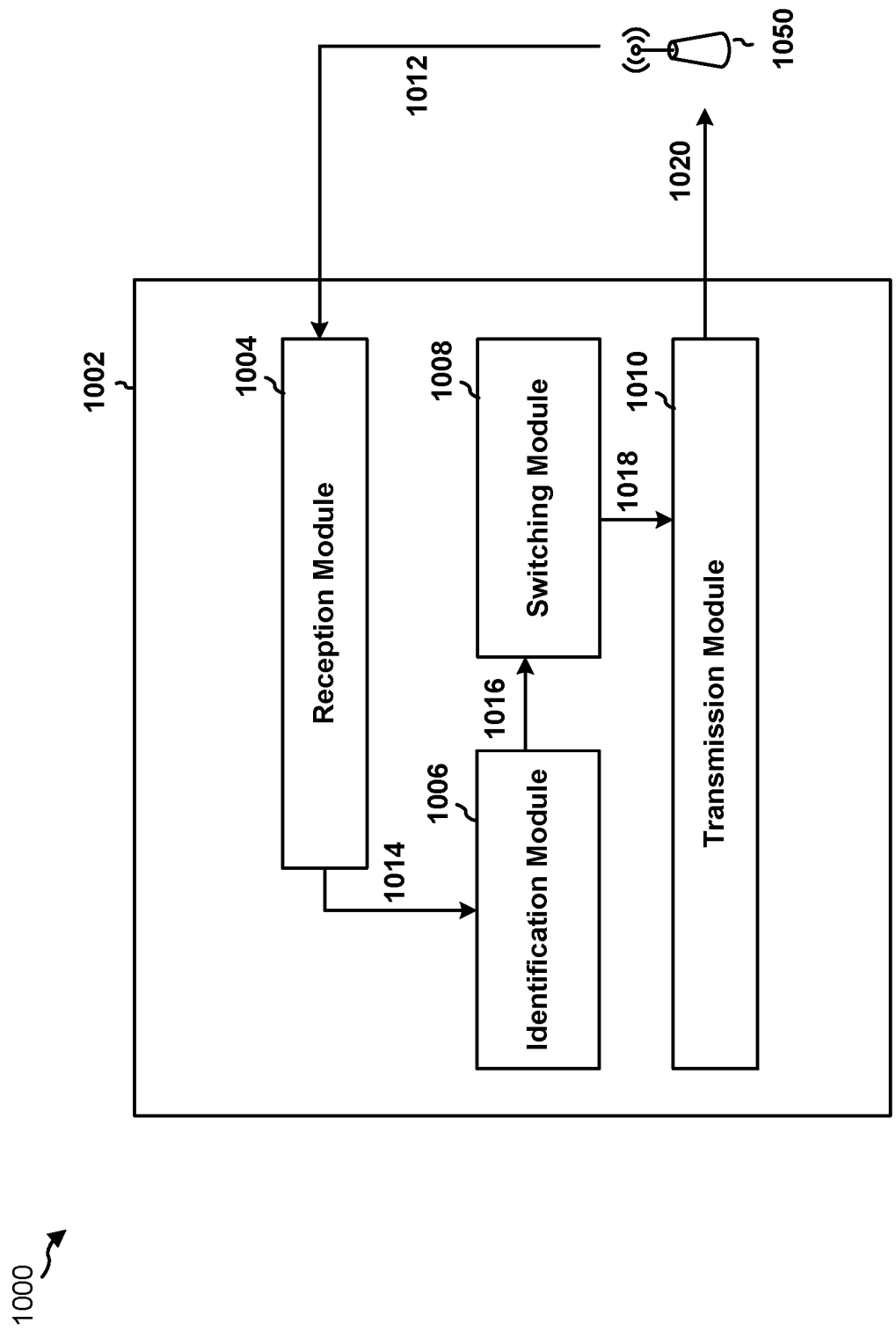
FIG. 10 is a conceptual data flow diagram illustrating the data flow between different modules/means/components in an example apparatus.

FIG. 10 is a conceptual data flow diagram 1000 illustrating the data flow between different modules/means/components in an example apparatus 1002. The apparatus 1002 may be a UE (e.g., the UE 120 and/or the like). In some aspects, the apparatus 1002 includes a reception module 1004, an identification module 1006, a switching module 1008, and/or a transmission module 1010.

The reception module 1004 may receive signals 1012 from a wireless communication device 1050 (e.g., a BS 110, a UE 120, and/or the like). The signals 1012 may include, for example, one or more beams to be received by the UE 120 or information identifying a scheduled gap or intermediate power state to be used by the UE 120 to smooth a transition from a first power state to a second power state. The reception module 1004 may provide the signals 1012 to the identification module as data 1014. The data 1014 may identify the scheduled gap or intermediate power state, or may include information used by the identification module 1006 to identify a first state and/or a second power state (e.g., information identifying signals to be received by the reception module 1004 and/or the like).

The identification module 1006 may identify a first power state (associated with a first transmission or reception of one or more first beams) and a second power state (associated with a second transmission or reception of one or more second beams) based at least in part on the data 1014 and/or other information. In some aspects, the identification module 1006 may identify a scheduled gap and/or one or more intermediate power states. For example, the identification module 1006 may receive or determine information identifying the scheduled gap and/or the one or more intermediate power states. The identification module 1006 may provide data 1016 to the switching module 1008 identifying the first power state, the second power state, the one or more intermediate power states, and/or the scheduled gap.

The switching module 1008 may switch from the first power state to the second power state using at least one of the scheduled gap or the at least one intermediate power state to smooth a transition from the first power state to the second power state. In some aspects, the switching module 1008 may control modules, or provide information to modules, that are used to transmit or receive the one or more first beams and the one or more second beams (e.g., the reception module 1004, the transmission module 1010, and/or the like). In some aspects, the switching module may provide data 1018 to the reception module 1004 and/or the transmission module 1010 to cause the switch from the first power state to the second power state (e.g., in the scheduled gap and/or via the at least one intermediate power state).

The transmission module 1010 may transmit information 1020 based at least in part on the data 1018. In some aspects, the transmission module may transmit an intermediate beam in between one or more first beams and one or more second beams to smooth a transition from the first power state to the second power state.

The apparatus may include additional modules that perform each of the blocks of the algorithm in the aforementioned flow chart of FIG. 9. As such, each block in the aforementioned flow chart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 10 are provided as an example. In practice, there may be additional modules, fewer modules, different modules, or differently arranged modules than those shown in FIG. 10. Furthermore, two or more modules shown in FIG. 10 may be implemented within a single module, or a single module shown in FIG. 10 may be implemented as multiple, distributed modules. Additionally, or alternatively, a set of modules (e.g., one or more modules) shown in FIG. 10 may perform one or more functions described as being performed by another set of modules shown in FIG. 10.

Figure 11:
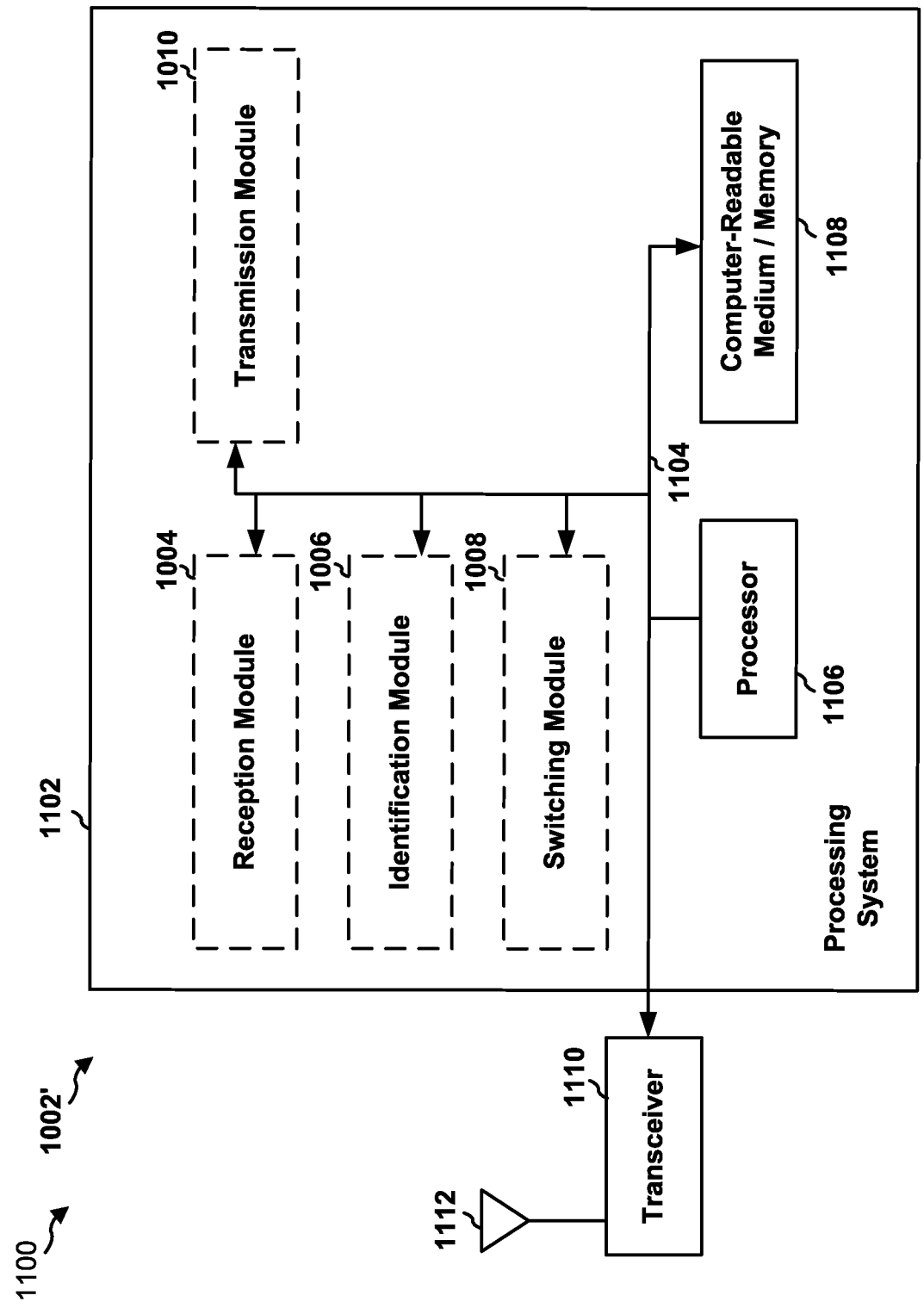
FIG. 11 is a diagram illustrating an example of a hardware implementation for an apparatus employing a processing system.

FIG. 11 is a diagram 1100 illustrating an example of a hardware implementation for an apparatus 1002' employing a processing system 1102. The apparatus 1002' may be a UE (e.g., the UE 120 and/or the like).

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware modules, represented by the processor 1106, the modules 1004, 1006, 1008, 1010, and the computer-readable medium/memory 1108. The bus 1104 may also link various other circuits such as timing sources, peripherals, voltage regulators, and power management circuits, which are well known in the art, and therefore, will not be described any further.

The processing system 1102 may be coupled to a transceiver 1110. The transceiver 1110 is coupled to one or more antennas 1112. The transceiver 1110 provides a means for communicating with various other apparatus over a transmission medium. The transceiver 1110 receives a signal from the one or more antennas 1112, extracts information from the received signal, and provides the extracted information to the processing system 1102, specifically the reception module 1004. In addition, the transceiver 1110 receives information from the processing system 1102, specifically the transmission module 1010, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described supra for any particular apparatus. The computer-readable medium/memory 1108 may also be used for storing data that is manipulated by the processor 1106 when executing software. The processing system further includes at least one of the modules 1004, 1006, 1008, and 1010. The modules may be software modules running in the processor 1106, resident/stored in the computer-readable medium/memory 1108, one or more hardware modules coupled to the processor 1106, or some combination thereof. The processing system 1102 may be a component of the UE 120 and may include the memory 282 and/or at least one of the TX MIMO processor 266, the receive processor 258, and/or the controller/processor 280.

In some aspects, the apparatus 1002/1002' for wireless communication includes means for identifying a first power state and a second power state, wherein the first power state is associated with a first transmission or reception of one or more first beams, and the second power state is associated with a second transmission or reception of one or more second beams; and means for switching from the first power state to the second power state, wherein the apparatus is configured to use at least one of a scheduled gap or at least one intermediate power state between the first power state and the second power state to smooth a transition from the first power state to the second power state. The aforementioned means may be one or more of the aforementioned modules of the apparatus 1002 and/or the processing system 1102 of the apparatus 1002' configured to perform the functions recited by the aforementioned means. As described supra, the processing system 1102 may include the TX MIMO processor 266, the receive processor 258, and/or the controller/processor 280. As such, in one configuration, the aforementioned means may be the TX MIMO processor 266, the receive processor 258, and/or the controller/processor 280 configured to perform the functions recited by the aforementioned means.

FIG. 11 is provided as an example. Other examples are possible and may differ from what was described in connection with FIG. 11.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   identifying, by a user equipment (UE), a first power state and a second power state,
     wherein the first power state is associated with a first transmission or reception of one or more first beams, and the second power state is associated with a second transmission or reception of one or more second beams;
   receiving, by the UE, transition information that identifies at least one of a scheduled gap or at least one intermediate power state;
   switching, by the UE, from the first power state to the second power state,
     wherein the UE is configured to use at least one of the scheduled gap or the at least one intermediate power state between the first power state and the second power state; and
   signaling a request to a base station for a guard period,
     wherein the guard period is used between a first transmission or reception and a second transmission or reception to allow a beam transition.

2. The method of claim 1, wherein the scheduled gap is negotiated by the UE and the base station.

3. The method of claim 1, further comprising:
   using stored information to determine whether the scheduled gap or the at least one intermediate power state is to be used.

4. The method of claim 3, wherein the stored information includes at least one of:
   a beam identifier of the one or more first beams or the one or more second beams,
   a threshold power level difference of the first power state and the second power state, or
   a threshold length of the transition from the first power state to the second power state.

5. The method of claim 1, wherein the scheduled gap or the at least one intermediate power state is based at least in part on information signaled by the base station.

6. The method of claim 5, wherein the information signaled by the base station is based at least in part on a capability report associated with the UE.

7. The method of claim 1, further comprising:
   determining the scheduled gap or the at least one intermediate power state based at least in part on a difference between the first power state and the second power state.

8. The method of claim 1, wherein the at least one intermediate power state includes a plurality of intermediate power states, and
   wherein the method further comprises:
     switching to each intermediate power state, of the plurality of intermediate power states, when transitioning from the first power state to the second power state.

9. The method of claim 1, further comprising:
   switching from the first power state to the second power state in the guard period between the first transmission or reception and the second transmission or reception.

10. The method of claim 1, wherein the guard period is provided by the base station based at least in part on signaling, by the UE, the request.

11. The method of claim 1, further comprising:
    transmitting an intermediate beam associated with the at least one intermediate power state when switching from the first power state to the at least one intermediate power state.

12. The method of claim 11, wherein the intermediate beam corresponds to blank data, garbage data, or padding data.

13. The method of claim 11, wherein the intermediate beam corresponds to are transmission or a repetition of data associated with the first transmission or the second transmission.

14. The method of claim 1, wherein the first transmission is a first uplink transmission and the second transmission is a second uplink transmission consecutive to the first uplink transmission.

15. The method of claim 1, wherein the first transmission and the second transmission are for a first set of sounding reference signal resources and a second set of sounding reference signal resources, respectively.

16. The method of claim 1, wherein the first transmission and the second transmission are transmitted in a same slot.

17. A user equipment (UE) for wireless communication, comprising:
a memory; and
one or more processors coupled to the memory, the memory and the one or more processors configured to:
identify a first power state and a second power state, wherein the first power state is associated with a first transmission or reception of one or more first beams, and the second power state is associated with a second transmission or reception of one or more second beams;
receive transition information that identifies at least one of a scheduled gap or at least one intermediate power state;
switch from the first power state to the second power state,
wherein the UE is configured to use at least one of the scheduled gap or the at least one intermediate power state between the first power state and the second power state; and
signal a request to a base station for a guard period, wherein the guard period is used between a first transmission or reception and a second transmission or reception to allow a beam transition.

18. The UE of claim 17, wherein the first transmission is a first uplink transmission and the second transmission is a second uplink transmission consecutive to the first uplink transmission.

19. The UE of claim 17, wherein the first transmission and the second transmission are for a first set of sounding reference signal resources and a second set of sounding reference signal resources, respectively.

20. The UE of claim 17, wherein the first transmission and the second transmission are transmitted in a same slot.

21. The UE of claim 17, wherein, when switching from the first power state to the second power state, the memory and the one or more processors are configured to:
switch from the first power state to the second power state in the guard period.

22. The UE of claim 17, wherein the memory and the one or more processors are further configured to:
determine the scheduled gap or the at least one intermediate power state based at least in part on a difference between the first power state and the second power state.

23. The UE of claim 17, wherein the memory and the one or more processors are further configured to:
use stored information to determine whether the scheduled gap or the at least one intermediate power state is to be used.

24. The UE of claim 23, wherein the stored information includes at least one of:
a beam identifier of the one or more first beams or the one or more second beams,
a threshold power level difference of the first power state and the second power state, or
a threshold length of the transition from the first power state to the second power state.

25. A non-transitory computer-readable medium storing one or more instructions for wireless communication, the one or more instructions comprising:
one or more instructions that, when executed by one or more processors of a user equipment (UE), cause the one or more processors to:
identify a first power state and a second power state, wherein the first power state is associated with a first transmission or reception of one or more first beams, and the second power state is associated with a second transmission or reception of one or more second beams;
receive transition information that identifies at least one of a scheduled gap or at least one intermediate power state;
switch from the first power state to the second power state,
wherein the UE is configured to use at least one of the scheduled gap or the at least one intermediate power state between the first power state and the second power state; and
signal a request to a base station for a guard period, wherein the guard period is used between a first transmission or reception and a second transmission or reception to allow a beam transition.

26. The non-transitory computer-readable medium of claim 25, wherein the first transmission is a first uplink transmission and the second transmission is a second uplink transmission consecutive to the first uplink transmission.

27. The non-transitory computer-readable medium of claim 25, wherein the first transmission and the second transmission are for a first set of sounding reference signal resources and a second set of sounding reference signal resources, respectively.

28. An apparatus for wireless communication, comprising:
means for identifying a first power state and a second power state,
wherein the first power state is associated with a first transmission or reception of one or more first beams, and the second power state is associated with a second transmission or reception of one or more second beams;
means for receiving transition information that identifies at least one of a scheduled gap or at least one intermediate power state; and
means for switching from the first power state to the second power state,
wherein the apparatus is configured to use at least one of the scheduled gap or the at least one intermediate power state between the first power state and the second power state; and
means for signaling a request to a base station for a guard period,
wherein the guard period is used between a first transmission or reception and a second transmission or reception to allow a beam transition.

29. The apparatus of claim 28, wherein the first transmission is a first uplink transmission and the second transmission is a second uplink transmission consecutive to the first uplink transmission.

30. The apparatus of claim 28, wherein the first transmission and the second transmission are for a first set of sounding reference signal resources and a second set of sounding reference signal resources, respectively.

31. The method of claim 1, wherein the guard period protects signals before and after the transition.

32. The UE of claim 17, wherein the scheduled gap is negotiated by the UE and the base station.

33. The UE of claim 17, wherein the scheduled gap or the at least one intermediate power state is based at least in part on information signaled by the base station.

34. The UE of claim 33, wherein the information signaled by the base station is based at least in part on a capability report associated with the UE.

35. The non-transitory computer-readable medium of claim 25, wherein the scheduled gap is negotiated by the UE and the base station.

36. The non-transitory computer-readable medium of claim 25, wherein the scheduled gap or the at least one intermediate power state is based at least in part on information signaled by the base station.

37. The non-transitory computer-readable medium of claim 36, wherein the information signaled by the base station is based at least in part on a capability report associated with the UE.

38. The apparatus of claim 28, wherein the scheduled gap is negotiated by the UE and the base station.

39. The apparatus of claim 28, wherein the scheduled gap or the at least one intermediate power state is based at least in part on information signaled by the base station.

40. The apparatus of claim 39, wherein the information signaled by the base station is based at least in part on a capability report associated with the UE.

* * * * *